United States Patent [19]
Hawkins

[11] 3,940,553
[45] Feb. 24, 1976

[54] FRAMELESS SPACER WITH VISCOELASTIC DAMPING MEANS

[75] Inventor: Ronald G. Hawkins, Massena, N.Y.

[73] Assignee: Aluminum Company of America, Pittsburgh, Pa.

[22] Filed: Feb. 24, 1975

[21] Appl. No.: 552,181

[52] U.S. Cl............. 174/42; 174/146; 188/1 B; 267/57.1 A; 403/111; 403/117; 403/162; 403/170; 403/224
[51] Int. Cl.² .................... H02G 7/14; H02G 7/12
[58] Field of Search............ 174/40 R, 42, 146; 188/1 B; 267/57.1 A, 136, 137, 141; 403/64, 111, 113, 117, 120, 162, 170, 174, 178, 217, 224, 225, 228

[56] References Cited
UNITED STATES PATENTS

| | | | |
|---|---|---|---|
| 2,366,860 | 1/1945 | Kraft | 403/224 |
| 2,468,311 | 4/1949 | TeGrotenhuis | 403/228 |
| 3,613,104 | 10/1971 | Bradshaw | 174/42 |

FOREIGN PATENTS OR APPLICATIONS

| | | | |
|---|---|---|---|
| 954,710 | 4/1964 | United Kingdom | 174/146 |
| 1,084,102 | 9/1967 | United Kingdom | 174/146 |
| 1,220,084 | 1/1971 | United Kingdom | 174/42 |

Primary Examiner—Laramie E. Askin
Attorney, Agent, or Firm—Elroy Strickland, Esq.

[57] ABSTRACT

A device for spacing overhead, parallel subconductors of a conductor bundle and for damping vibrations of the subconductors. The device comprises rigid, elongated arms pivotally connected together at one end of each arm and having a clamp at the other end of each arm for attaching the arms to respective subconductors. A resilient, viscoelastic pad or disc is disposed between the arms in opposed recesses provided in the arms at the location at which the arms are pivotally connected together, the pad or disc providing the primary damping mechanism for the device.

8 Claims, 7 Drawing Figures

FRAMELESS SPACER WITH VISCOELASTIC DAMPING MEANS

BACKGROUND OF THE INVENTION

The present invention relates generally to a damping spacer for overhead conductor bundles, and particularly to a compact damping spacer that has no central frame, is economical to manufacture, is light in weight and requires a minimum of parts and material.

There are presently available a large variety of devices for spacing overhead, parallel conductors and for damping vibrations and oscillations of such conductors. However, all of these devices have certain disadvantages that the damping spacer of the present invention does not have. Many of the presently available damping spacers, for example, employ a central frame on which conductor clamps are mounted, as a part of the structure designed to effect spacing of the conductors, and stop or motion limiting structures associated with the frame and clamps for protecting damping elements of the spacer from excessive forces that may be encountered in overhead bundle conductors. The clamps of these devices usually have relatively short arms, and are often connected to the frame only through the agency of the damping elements so that the damping elements are required to support the weight of the frame. This tends to reduce the life and damping efficiency of the damping elements.

The use of a frame and motion limiting structures is also costly in that the components involved, and the process of assembling them, involve costs that are reflected in the ultimate selling price of the spacer. Further, the short arms of the clamps do not provide a sufficiently effective lever for working rather stiff, higher tensile strength damping elements that are employed because of their higher strength and longer life characteristics. Such elements require high thresholds of vibration energy before damping action is initiated in comparison to softer, shorter lived damping devices.

A further disadvantage of the frame type of spacer is the fact that the mass and weight of the frame add to the overall weight of the spacer, which weight must be borne by the conductors to which the spacer is attached. Also, the additional weight involves additional cost in the process of shipping and transporting such spacers.

Examples of damping spacers employing a central frame and relatively short clamp arms are shown in U.S. Pat. Nos. 3,083,258; 3,443,019; 3,474,184; 3,613,104; 3,748,370 and 3,777,047. Examples of spacers in which damping elements support the weight of a frame are shown in the above U.S. Pat. Nos. 3,083,258; 3,443,019; 3,748,370; 3,777,047, as well as in U.S. Pat. Nos. 3,582,983; 3,617,609 and 3,702,371.

Another problem encountered with certain of the presently available damping spacers is the inability of the arms of the spacers to return to their original, normal position after the arms are moved in response to conductor motion. The large power authorities, such as the Tennessee Valley and Bonneville Power Authorities, generally require that the spacer arms of a spacer return to a normal position under their own effort. Damping spacers using friction discs as the damping elements, for example, either depend upon the return movement of the conductors, to return the spacer arms to their normal, original position, or a spring element is required to return the arms. Further, a spring element is required to compensate for wear of the friction discs. A damping spacer using such friction discs and spring elements is shown in U.S. Pat. No. 3,474,184, listed above. In FIGS. 4 and 5 of British Patent No. 1,084,102, a damping spacer is shown in which friction discs are used without a spring element to return the spacer arms to a normal position. Spring elements, however, are used to preload the friction discs against the arms of the spacer in the British patent.

Another disadvantage of the presently available and prior devices for spacing conductors is the inability of these devices to insure spacing of the conductors under severe, short circuit conditions. Short circuits on a conductor bundle involve flows of heavy current through the conductors that generate a corresponding strong magnetic field component that directs the conductors rapidly inwardly in a straight line toward the geometric center of the bundle, and thus toward each other. Unless a rigid spacing structure is provided to directly resist these forces, the conductors will come together and become entangled with one another.

A central, rigid frame, used in the type of spacer discussed above, is helpful in this regard but suffers from the disadvantages of frame type spacers outlined above. U. S. Pat. No. 3,230,295 shows a conductor spacing device that would function as an effective spacer under short circuit conditions, if constructed of suitably rigid, high strength materials, but the device is not an effective damper of conductor vibration or oscillation since it does not employ a mechanism that is capable of dissipating the energy of such vibration or oscillation in any significant manner.

A further problem with certain, presently available damping spacers is the heavy stresses and cycling imposed upon the damping elements of the spacers by "articulation" of the spacer within a bundle of conductors. Individual conductors in a span of a conductor bundle tend to move relative to one another in a lengthwise or longitudinal direction of the conductors due to unequal contraction and stretching of the conductors, and due to the wind blowing across the conductors at velocities that bow the conductors in the direction of the wind by different amounts. These relative conductor movements and bows are large and thus cause any spacers clamped to the conductors to articulate within the bundle by corresponding large amounts. If the clamps clamping the spacer in the bundle are connected to a frame of the spacer through the agency of the damping elements, the damping elements are heavily worked and stressed by such articulation, such heavy working greatly shortening the life of the damping elements. This is true even when resilient bushings are employed between the spacer clamps and the conductors. In order for such bushings to effectively protect the damping elements from such articulating movements, and the resulting heavy stresses, the bushings would have to be soft to the point that they would not effectively grip the conductor. Examples of damping spacers in which the damping elements of the spacers would be unprotected from such articulation stresses are shown in the above-listed U.S. Pat Nos. 3,582,983 and 3,702,371. An example of a spacer particularly designed to provide articulation movements within the spacer is shown in U.S. Pat. No. 3,263,021. Such a structure, however, provides little or no damping of conductor vibration or oscillation.

Another problem associated with certain, presently available damping spacers is the general inefficiency of the mechanism associated with the spacers that provides the damping function. For example, the damping means associated with frame type spacers generally work independently of each other in damping vibration of one conductor of a bundle of conductors so that only one damping element is operable to dampen the vibration, the other elements remaining inactive and unused.

BRIEF SUMMARY OF THE INVENTION

Broadly, the present invention is directed to a damping spacer that does not have the disadvantages of the spacers discussed above and has, therefore, the advantages of being light in weight, economical to make, rigid in the direction of the forces produced by short circuits on a line so as to resist collapse of the spacer and the bundle, and efficient in damping oscillations and vibrations of the conductors, while simultaneously providing the damping elements of the spacer with articulation protection. These advantages result from a frameless spacer structure comprised simply of rigid spacer arms pivoted together at one end of each arm by means of a single pin or bolt, for example, with the arms extending radially outwardly from the location of their pivoted ends to respective conductors of a bundle, the arms having clamps at the conductor ends for clamping to respective ones of the conductors. Damping of oscillation or vibration of one or more of the conductors is efficiently effected by rotational shear of a viscoelastic pad or disc held against rotation between overlapping portions of the arms at the location of the pivot when a conductor vibrates. The shear of the disc is sufficient to generate heat within the disc, the dissipation of this heat to the arms and to the atmosphere being effective to dissipate the energy of the motion of the conductor. Since the arms of the spacer are rigid and radiate outwardly from a center location of the conductor bundle, spacing of the conductors is assured under short circuit conditions, the forces generated by such conditions being in line with the rigid arms which directly oppose such forces. With such a structure and function, no frame is necessary and no motion limiting means is needed to protect the damping pad or disc from such forces, though such a means can be inexpensively provided in a manner explained in detail hereinafter. Rather, the rigid pin at the pivot location receives the forces generated by such short circuiting, as well as receiving other forces and stresses, such as caused by articulating movements of the spacer. Also, in the spacer of the present invention, the viscoelastic disc is not required to carry the weight of a spacer frame, with the resulting stresses, so that the life of the disc is thereby lengthened and the damping efficiency of the disc maintained.

THE DRAWINGS

The invention, along with its advantages and objectives, will be better understood from consideration of the following detailed description and the accompanying drawings in which.

PREFERRED EMBODIMENT OF THE INVENTION

Figure 1:
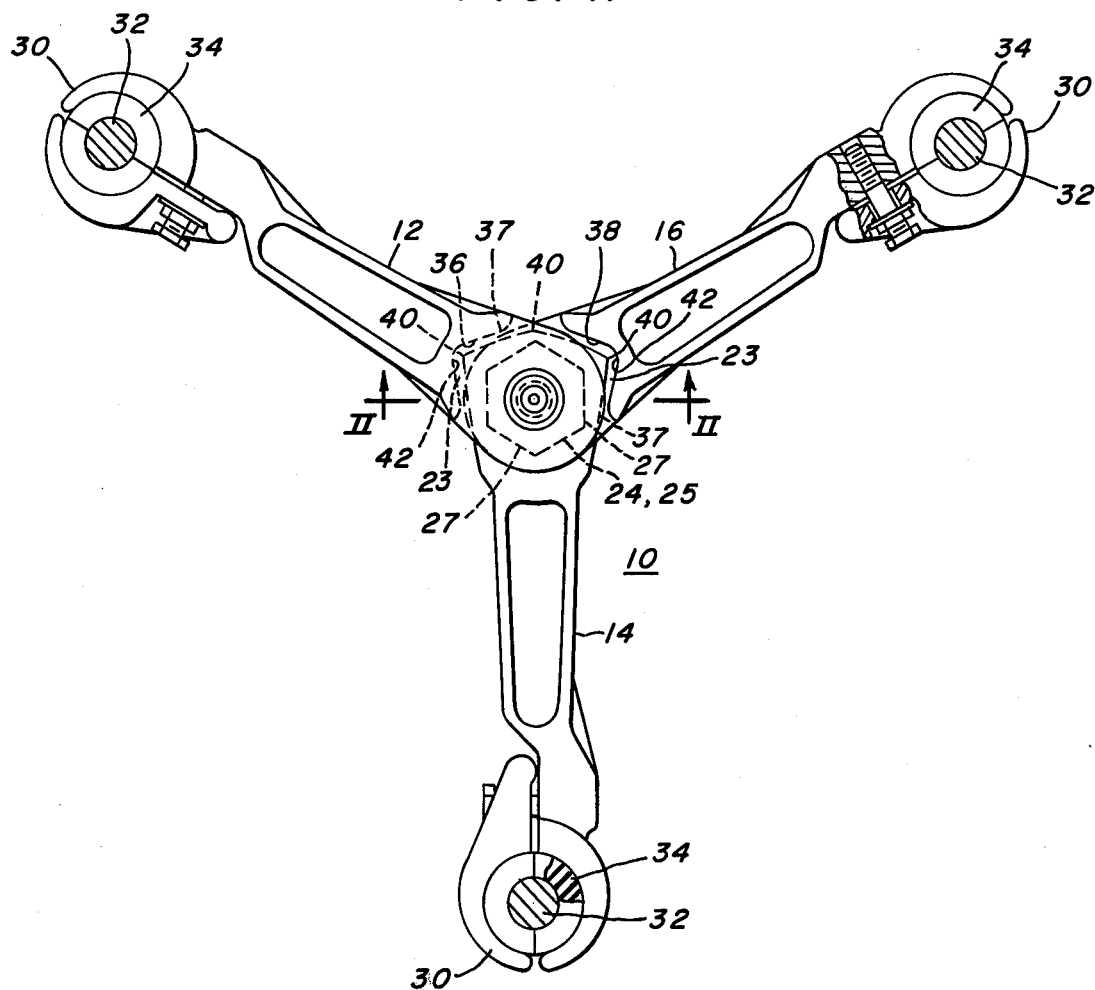
FIG. 1 is a side elevation view of a three conductor damping spacer of the invention.
Figure 2:
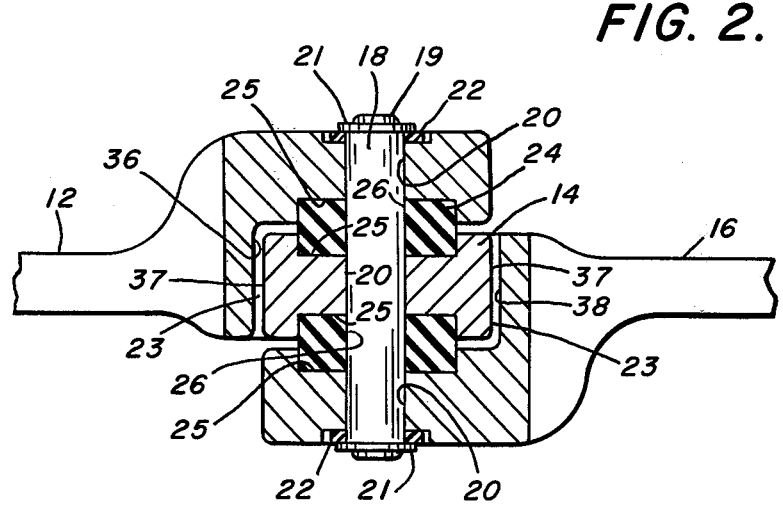
FIG. 2 is a sectional view of the structure of FIG. 1 taken along line II—II in FIG. 1.

Referring now to the drawing, FIG. 1 of the drawing shows a damping spacer 10, having three, elongated, rigid arms 12, 14 and 16 connected together at one of their ends and at or adjacent a common, central location of the spacer by a rigid pin 18 extending through aligned openings 20 (FIG. 2) provided in overlapping end portions of the arms. Preferably, pin 18 is riveted at each of its ends to secure the arms together, thereby eliminating the use of threaded fasteners which may become loose under the vibrating conditions encountered by the spacer. The securing function is effected by a flange portion 19 formed on each end of the pin when the pin is riveted. In FIG. 2, metal washers 21 are shown located immediately beneath the flange portions and around the pin, and second, heat resistant washers 22 are located beneath the metal washers.

The diameters of the openings 20 in the arms and the diameter of the pin are substantially the same so that a snug fit is provided between the pin and the arms. However, the snug fit is such that the arms are allowed to pivot relatively on and about the pin when the conductors to which the arms are attached undergo oscillation or aeolian vibration.

As best seen in the view of FIG. 2, one of the three arms (arm 14) is located between two outside arms (12 and 16), the two outside arms being preferably offset, as best seen in FIG. 2, to place the major extent of the arms in planes closely approximating a common plane. The offset of the outside arms provides relatively deep, opposed recesses or cavities 23 in the outside arms, which recesses accommodate therein the end of the center arm.

The overlapping end portions of the arms are separated from each other by two, relatively thick, viscoelastic, resilient discs 24, as shown in section in FIG. 2, the discs being located in opposed recesses 25 provided in each two adjacent arms and generally centered on the openings 20 provided in the arms. Viscoelastic materials suitable for the discs include rubber, neoprene and butyl, which may be electrically insulating or semiconductive. Openings 26 are provided in the discs, the openings 26 being aligned with each other and with the openings 20 provided in the arms to receive therethrough pin 18. The breadth dimension and configuration of the recesses 25 and the discs 24 are substantially the same, as indicated in the figures, so that the discs are held firmly in place in the recesses and about the pin. As indicated in hidden outline in FIG. 1, the viscoelastic discs 24 and the recesses 25 in the arms may have a hexagonal configuration, in plan view, such a configuration providing the discs and recesses with planar sides 27. The hexagonal configuration has been found particularly suitable for the three conductor spacer of FIGS. 1 and 2, though the invention is not limited to such a spacer nor to such a shape for the discs 24 and recesses 25.

At the end of each of the arms 12, 14 and 16 opposed to the ends connected to each other by pivot pin 18 is located means 30 for clamping the arms respectively to three subconductors 32 of a three conductor bundle, one-half of each clamping means being fabricated preferably as an integral part of its associated arm, as shown in FIG. 1. The arms and integral clamp halves, for example, may be formed by a casting or forging process in a relatively simple manner, using a suitable aluminum alloy to provide a spacer device that is light in weight yet has a rugged, high strength characteristic. The clamp halves may directly engage the conductors 32, or, the curved seats of the clamp halves may contain bushings 34 made of a semiconducting, resilient material, as indicated in FIG. 1.

The ends of each of the arms 12, 14 and 16 adjacent the location of the pivot (18) are preferably provided with opposed, planar surfaces 36, 37 and 38, respectively, the planar surfaces 36 and 38 defining the sides of the recesses 23 provided in outside arms 12 and 16. Further, the planar surfaces 37 at the end of the inside arm 14, in combination with surfaces 36 and 38, define a relatively narrow space (23) between the ends of the arms adjacent pin 18. Numeral 23 is here used to define this space since the pivot end of the center arm 14 occupies the recesses (23) provided in outside arms 12 and 16. The planar surfaces are angularly disposed with respect to each other, the end of the inside arm having four such planar surfaces (37) which face in an outwardly direction, while the planar surfaces (36 and 38) defining the recesses 23 of the outside arms face inwardly. Thus, the inwardly facing surfaces 36 and 38 of the outside arm are disposed opposite the outwardly facing surfaces 37 of the inside arm, and in close proximity thereto across space 23.

In a similar manner, the planar surfaces 37 of the inside arm form outwardly facing corners 40 (FIG. 1) at the intersections of the surfaces which are disposed opposite inwardly facing corners 42 of the outside arms, as indicated in FIG. 1, when the arms of the spacers are in a normal or rest position.

The operation of the damping spacer of FIGS. 1 and 2 is as follows. With the spacer installed in a conductor bundle, and with movement of at least one of the conductors of the bundle in the general plane of the spacer 10, as would occur with air currents causing aeolian vibration or oscillation of the conductor, the spacer arm associated with the moving conductor pivots on pin 18 and rotates relatively to the other arms about pin 18. This relative movement places the associated viscoelastic disc 24 in torsional shear, the disc being held against relative rotation with respect to the arms by virtue of the planar sides 27 of the hexagonal shape of the discs 24 and of recesses 25 in the arms. The torsional shear of the one disc will tend to rotate the adjacent spacer arm such that torsional shear is placed upon the next adjacent disc, the motion of the one conductor thereby tending to place both discs in shear. In this manner, both discs will function to dissipate the energy of vibration of a single conductor. The material of each disc has a hysteresis characteristic that produces heat in the disc when the shearing motion occurs, and this heat is immediately dissipated into the spacer arm portions in contact with the disc and to the atmosphere surrounding the disc and arms, the dissipation of this heat functioning to rapidly dissipate the energy that the vibrating conductor receives from the air currents causing vibration of the conductor. In this manner, vibration of the conductor is stopped before the vibration has opportunity to work the conductor in any substantial manner, the hardware (not shown) supporting the conductor at supporting towers, and the spacer 10, including the viscoelastic discs, the invention thereby increasing the life of the discs over less efficient damping devices.

Since the viscoelastic discs 24 are resilient elements and retain the memory of their original configuration, the discs return the arms of the spacers and the associated conductors 32 to a normal, original position when the conductors are moved from their normal position by any substantial amounts.

In addition to the energy dissipated by shear of the viscoelastic discs 24, sliding friction occurring between the bearing surfaces of the spacer arms provided by openings 20 and pin 18, and between the arms and washers 22 and/or the flanges 19 of the pivot pin, also provide vibration damping by dissipating the energy of the vibration in the form of heat.

Further, the clamp arms of spacer 10 are relatively long such that they provide substantial leverage (over the short arm extensions of some prior damping spacers) that is more effective in placing relatively heavy or stiff viscoelastic elements in shear. Thus the spacer of the present invention can be provided with a greater threshold of damping action in comparison to those devices providing small leverage on the damping mechanism, with the added advantage of the higher tensile strengths accompanying such elements.

As explained earlier, with certain prior damping spacers, articulation of the spacer within a bundle, which is due to large, longitudinal movements of the conductors (32), places heavy stresses on the damping elements. In the present invention, the close, snug fit existing between the rigid pin 18 and the rigid, pivot ends of the spacer arms prevents the damping elements, i.e., discs 24, from being worked and stressed by such articulation. Rather, in the spacer of FIGS. 1 and 2, articulation stresses are absorbed by the thick resilient bushings 34 provided in the clamps 30 of the spacer arms. In the case where the clamps 30 directly engage the conductors, the spacer arms can then be resiliently spaced apart on the pivot pin 18 to permit relative movement of the arms along the pin for the purpose of accommodating relative longitudinal movements of the conductors.

Another advantage of the damping spacer of the invention is associated with the location of the spacer arms and pivot pin 18 and their relation to the general center location of the spacer. As discussed earlier, short circuits on a line generate forces that are directed inwardly to the center of the bundle such that the conductors are forced toward the center and thus toward each other. Since the pivot pin and arms of the spacer of the invention are rigid structures, and since the arms extend directly into the center of the bundle when installed in the bundle, and to the pin, the arms and pin are directly in line with such forces such that these forces are easily and directly resisted by the structural columns of the arms and by the pin. In this manner, the conductors of the bundle are prevented from coming together when a short circuit occurs on the bundle. The size and material of the arms and pin are such that their strength is sufficient to handle shear and compression forces that act on the pin and arms.

In addition, since such inwardly directed forces are in line with the rigid arms and pin, the necessity for mechanical stop or motion limiting means to protect the damping cables from such forces is removed.

A further advantage of the spacer 10 is that during the time at which the conductors are at rest, and therefore the arms of the spacer are at rest, the damping elements (viscoelastic discs 24) are free of supporting stresses, there being no frame or other structure to be supported by the elements. In this manner, the life of the discs and their effective operation as the primary damping mechanism are extended.

With the occurrence of a predetermined amount of relative rotation of the arms of the spacer 10 about pin 18, the outwardly facing corners 40 of the inside arm 14 will engage the planar surfaces 36 or 38 of the outside arms 12 and 16 to stop further relative rotation. The amount of such rotation is predetermined by the dimension of the narrow space 23 between the inner and outer planar surfaces of the arms. In this manner, with excessive relative movement of one or more of the conductors 32, the corners 40 of arm 14 and the planar surfaces 36 and 38 of arms 12 and 16 move to engage each other and thereby function to protect the viscoelastic discs from excessive working by stopping further relative rotation of the arms in the rotational direction involved. This protection afforded by such a stop means is inexpensive to provide since the planar surfaces can be formed when the arms are fabricated, such as by a casting or forging process.

Further, the spacer 10 is itself economical to manufacture since only a minimum of simple, inexpensive components are required. For a three conductor bundle spacer, for example, only two viscoelastic discs are required. Further, as indicated earlier, no frame is required, and the spacer arms and clamps are easily cast or forged. The viscoelastic discs, the pin, and the washers associated with the pin are relatively inexpensive components that are readily assembled enabling manufacture of the spacer of the invention on a mass-produced basis, the consequent unit cost of the spacer being quite low. This, coupled with the fact that the minimum number of components involved provides a light weight device, providing further economies in shipping and handling the device, makes the damping spacer 10 economically attractive over heavier, more costly and more complicated spacing devices, while simultaneously providing a structurally sound and rugged device.

Figure 3A:
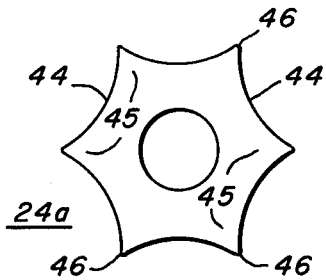
FIGS. 3a to 3d are plan views of damping bushings suitable for use in the spacer of FIGS. 1 and 2.

The viscoelastic discs 24 can be provided with an enhanced, variable damping characteristic by providing the structural corners of discs with a sharpness that gradually increases from a thicker and broader base structure, as shown in FIGS. 3a to 3d of the drawings. In FIG. 3a, disc 24a is shown in which the sides 44 thereof are inwardly curved to provide peripherally spaced, outwardly pointed corners 46 that have a greater sharpness than the corners of the hexagon shaped disc of FIG. 1. The curved sides and pointed corners of the disc provide relatively thin disc body portions, outwardly pointed corners 46, and thick disc body portions 45.

Figure 3B:
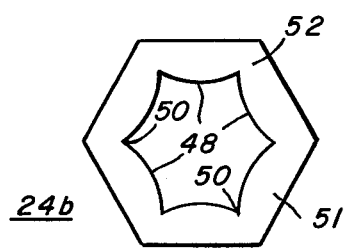

In FIG. 3b of the drawings, a disc 24b has the outside, hexagon configuration of the disc of FIG. 1, while the inside of disc 24b is provided with an opening defined by inwardly curved sides 48 which, in turn, form outwardly extending, sharpened corners 50, the curved sides and sharpened corners providing respectively, circularly spaced apart, relatively thick and thin wall portions 51 and 52 respectively.

Figure 3C:
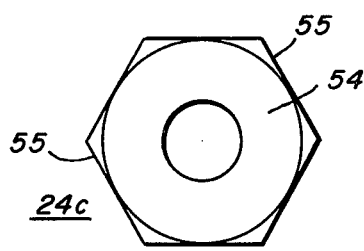

FIG. 3c shows a viscoelastic disc 24c having at least one circular portion 54 and an integral hexagonal portion 55, the hexagonal portion being of reduced thickness, in the axial direction of the disc, in comparison to the overall axial thickness of the disc. This provides the disc with corners that are more flexible than the corners of the disc of FIG. 1, and more flexible than the circular portion 54 of the disc.

Figure 3D:
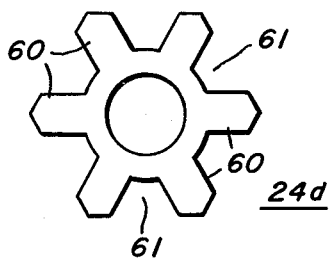

In FIG. 3d of the drawings, a viscoelastic disc 24d is shown having elongated, radially extending extensions 60 peripherally spaced apart by indented areas 61. Like the disc structure of FIGS. 3a to c, the structure of FIG. 3d provides a disc body having circularly spaced apart, narrow and thick wall or body areas. These relatively narrow and thick wall areas provide an enhanced, variable damping characteristic for the spacer of the invention since the peripheral, thin wall portions are more easily worked to provide damping of small amplitude, low energy vibrations of the conductors spaced by the spacer of the invention, while the thicker portions of the disc require larger amplitude and higher vibration forces to effect rotational shear of the thicker portions and thus to effect damping action. In using the disc structures of FIGS. 3a to d, the spacer arms are provided with recesses having configurations and dimensions corresponding to those of these discs.

Figure 4:
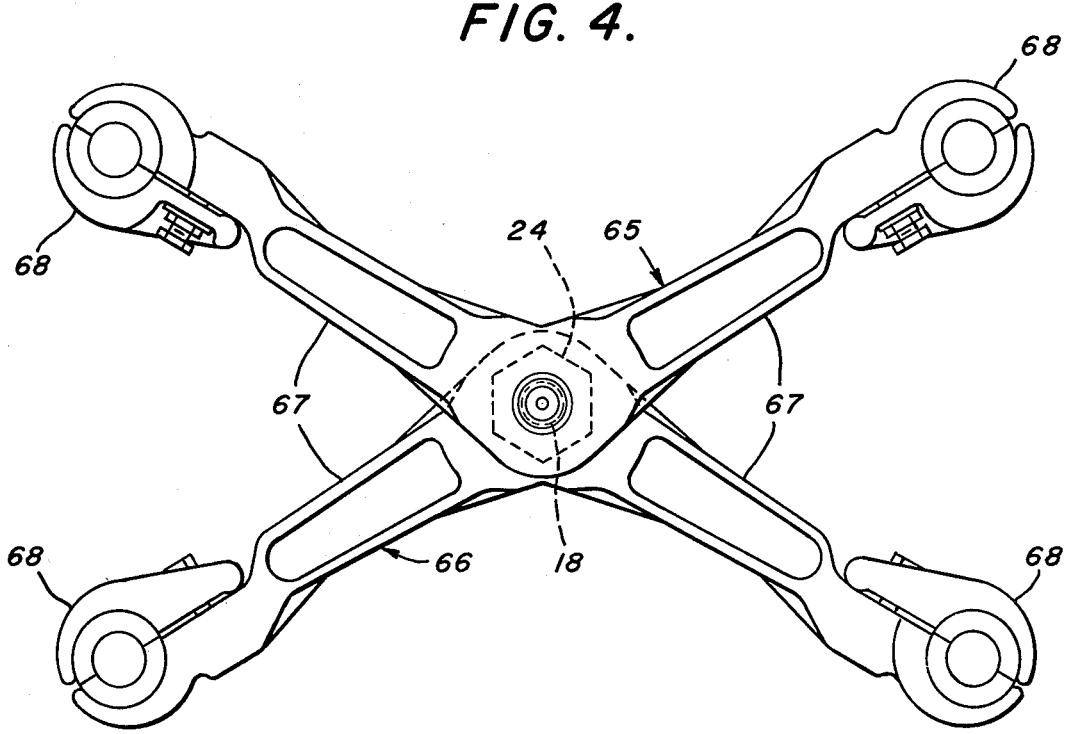
FIG. 4 is a side elevation view of another embodiment of the invention.

FIG. 4 of the drawings shows a damping spacer embodiment of the invention in which only two arm structures 65 and 66, and a single viscoelastic disc or pad 24, are sufficient to space and dampen a four conductor bundle. Each of the arm structures comprises two angularly disposed, unitary, rigid arms or columns 67, and conductor clamps 68 at the respective ends of the columns. The structures 65 and 66 may be two identical castings, and, as indicated in FIG. 4 by numeral 18, are pivotally secured together adjacent a center location thereof, with the disc 24, in the manner described above in connection with FIGS. 1 and 2. With vibration or oscillation of any one of the conductors of the bundle to which the arms of the spacer of FIG. 4 are attached, relative motion occurs between the two structures 65 and 66 to place the viscoelastic disc in rotational shear to thereby dampen the vibration or oscillation.

The principle of using two castings to space and dampen four conductors, as discussed above, is applicable to spacing three conductors, and to spacing more than four conductors, since one of the castings may comprise any number of integrally formed, rigid arms or columns.

Whereas particular embodiments of the invention have been described above for purposes of illustration, it will be evident to those skilled in the art that numerous variations of the details may be made without departing from the invention as defined in the appended claims.

What is claimed is:

1. A lightweight, inexpensive frameless damper spacer for parallel, overhead conductors comprising at least two, rigid, spacer arms, rigid pin means pivotally connecting the arms together adjacent a central location of the spacer, means at the end of each arm remote from said central location for clamping each of the arms to a respective overhead conductor, opposed recesses provided respectively in the arms adjacent said central location, a relatively thick, resilient viscoelastic disc located and secured between said arms and in said recesses, the opposed recesses and disc having matching configurations that function to hold the viscoelastic disc against relative rotation with respect to the arms when relative rotation of the arms occurs about said rigid pin means.

2. The structure of claim 1 in which the damping spacer comprises three rigid spacer arms and conductor clamps, with each two adjacent arms of the three arms having opposed recesses receiving a viscoelastic disc therebetween.

3. The structure of claim 1 in which the recesses and discs have a hexagonal configuration.

4. The structure of claim 1 in which the spacer arms and disc are provided with aligned openings at the location of the rigid pin means pivotally connecting the arms together, the rigid pin means pivotally connecting the arms together extending through the aligned openings.

5. The structure of claim 4 in which the diameters of the openings and rigid pin means are substantially the same.

6. The spacer of claim 1 in which the viscoelastic disc has inwardly extending side portions providing outwardly directed, relatively sharp, pointed corners, the pointed corners providing an enhanced, variable damping characteristic for the spacer.

7. The spacer of claim 1 in which the viscoelastic disc has a hollow, center configuration providing the disc with relatively narrow wall portions peripherally spaced apart by relatively thick wall portions, the relatively narrow and thick wall portions providing an enhanced, variable damping characteristic for the spacer.

8. The spacer of claim 1 including at least three spacer arms for spacing at least three parallel conductors, with two of the spacer arms being a unitary structure pivotally connected to the third arm.

* * * * *